United States Patent [19]

Norrie

[11] Patent Number: 5,326,308
[45] Date of Patent: Jul. 5, 1994

[54] VERTICAL SCALDING APPARATUS

[76] Inventor: Lyle W. Norrie, 24 Stoneglen Drive, Etobicoke, Ontario, Canada, M9C 2V5

[21] Appl. No.: 51,221

[22] Filed: Apr. 23, 1993

[51] Int. Cl.$^5$ ............................................. A22B 5/08
[52] U.S. Cl. ........................................ 452/80; 452/77
[58] Field of Search ...................... 452/74, 75, 76, 77, 452/78, 80

[56] References Cited

U.S. PATENT DOCUMENTS

| | | | |
|---|---|---|---|
| 3,561,040 | 2/1971 | Floden | 452/77 |
| 3,657,768 | 4/1972 | Snowden | 452/77 |
| 4,947,518 | 8/1990 | Covel, III | 452/80 |
| 4,961,248 | 10/1990 | Criscione, II et al. | 452/80 |

Primary Examiner—Willis Little

[57] ABSTRACT

Apparatus for the vertical scalding of animal carcasses on a continuously moving conveyor line and having at least one chamber, a conveyor system supported in the chamber forming a path through the chamber, and for suspending carcasses at spaced intervals along the conveyor, and continuously moving them within the chamber, a first hot water deluge located along a first portion of the conveyor, and a first supply for supplying hot water so that hot water may pour continuously downwardly alongside each side of the first portion of the conveyor, a collector beneath the first conveyor portion for collecting water, and a filter for filtering the water collected, and a pump for pumping the water back upwardly, a further hot water deluge, and collector, and filter, and pump for a further conveyor portion, so that hot water may be separately poured downwardly around the further conveyor portion, and collected therebeneath and filtered and pumped therefrom upwardly once more, and a heat source for each of the water supplies to maintain water at a desired elevated temperature, and controls for detecting the water flow rate and temperature.

9 Claims, 6 Drawing Sheets

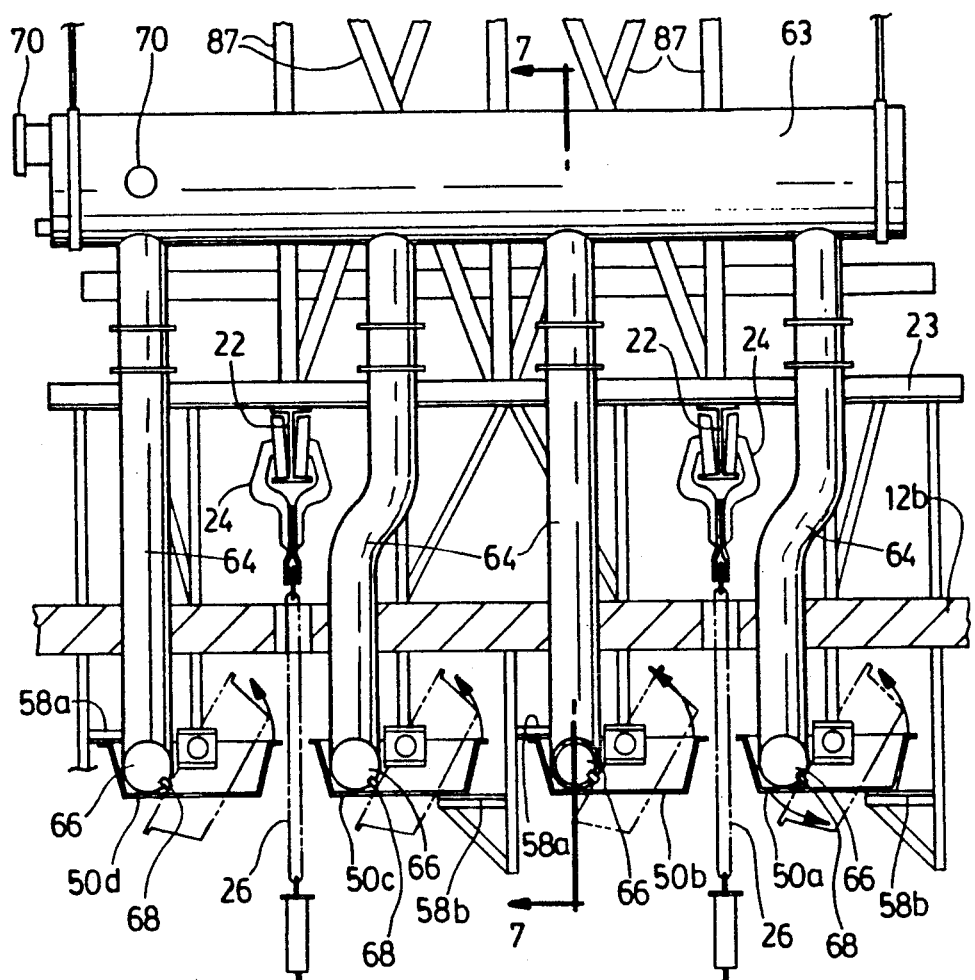
FIG 6
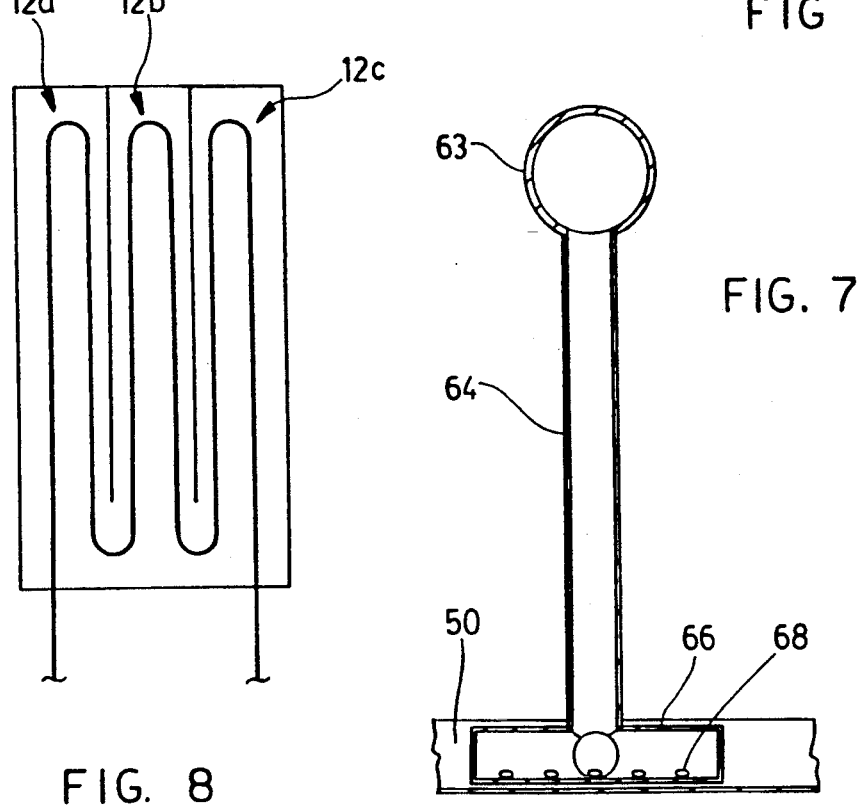
FIG. 8
FIG. 7

VERTICAL SCALDING APPARATUS

FIELD OF THE INVENTION

The invention relates to vertical scalding apparatus for scalding animal carcasses and in particular to apparatus for the scalding of hog carcasses prior to dehairing.

BACKGROUND OF THE INVENTION

The processing of animal carcasses, which usually takes places right after slaughtering, usually involves the step of scalding the carcass to remove dirt and other contaminants. In the case of hog carcasses, the scalding also softens the hair and opens the hair pores in the skin so that the carcass can be dehaired. In the past, this process has been carried out using relatively primitive equipment. Elongated tanks or vats holding hot water were provided, and carcasses were simply dumped in one end of the tank and floated, pushed, or dragged along to the other end. In some cases some form of agitation was provided. In other cases some primitive form of movement device such as a drag chain was provided for pulling the carcasses through the tanks.

In most cases some water from the tank was removed and other water was added, either periodically or continuously. It will however be appreciated that, a short while after processing has been commenced, the water in the tank will be substantially contaminated with dirt and other contaminants from the skin and hair, and faecal and fluid discharges of carcasses that have already been processed. As a result, although the carcasses were processed through the tanks, when they exited from the other end, the carcasses still carried some of the contamination which was inevitably present in the water in the tanks from preceding carcasses.

An improved form of carcass washing apparatus is shown in U.S. Pat. No. 4,829,637, inventor Lyle W. Norrie, and assigned to Knud Simonsen Industries Limited. In that patent, apparatus was provided consisting of a chamber with an overhead conveyor rail, and a system of water showers or sprays extending along the upper region of the chamber adjacent the conveyor. Beneath the conveyor there was provided a system of angle supports with movement means on such supports. In this way, when the carcasses were supported on the overhead conveyor rail, they lay at an angle on one or other of the supports. The movement means on the supports and on the conveyor rails moved at the same speed so that the carcasses were progressively washed on one side, and then on the other side.

Water was collected beneath the supports, filtered, reheated and recycled back to the upper region of the chamber so that it could continuously be reused. In this way, the continuous filtration of the water and the continuous heating of the water provided that substantially clean water would be used for washing and scalding each carcass so that contamination was substantially reduced by the time the carcass had been fully processed through the apparatus.

However, this apparatus had one disadvantage, namely that the carcasses were supported on one side, while the other side was exposed to the shower or water spray coming downwardly within the chamber. As a result, while one side was being cleansed and processed, the other side was not being processed to the same extent, Consequently, the carcasses would have to be processed for a considerable length of time before they were completely cleaned and scalded. In addition, the provision of the movement means on the lower supports added to the expense of the overall apparatus and involved maintenance and consequent down time which was somewhat of a disadvantage.

Clearly, it is advantageous if the scalding of carcasses can be carried on in apparatus such that the carcass is scalded on substantially all surfaces simultaneously, so that all contamination is washed downwardly off the carcass, from all sides, at the same time.

However, this type of facility must also be designed with certain other considerations in mind. In the first place, the carcasses must be processed for a sufficient length of time to provide the desired end result, namely a clean and fully scalded carcass, and preferably in the case of hogs, a carcass where the hairs have been softened and the skin hair pores opened sufficiently uniformly over the entire carcass to permit hair be easily removed. In order to this, it is apparent that the carcasses when they enter the facility will be carrying the maximum of dirt and contamination. It is desirable that this shall be washed off and removed, and the carcass then re-scalded further, in fresh, heated water, in a series of stages, so that as far as possible the carcasses shall be passed through successive stages of washing in which, in each stage, the water is cleaner than in the previous stage.

In each stage, the water is desirably filtered, so that as far as possible the contamination that is present in that stage is continuously removed, and the water is maintained at each stage at a desired process temperature. The process temperature, may vary from one stage or zone of the apparatus to another.

Preferably in order to achieve this type of result there will be two (or in some cases more) cleaning or scalding zones, with each one separate from the next, and arranged so that the water circulating within any one zone is substantially prevented from entering the downstream zone(s), although it may be recycled to the previous more dirty zones, upstream.

However, this in turn creates a whole new series of problems. In order to achieve the necessary cleansing and scalding of a carcass in any one zone it is necessary that the carcass should remain in that zone for a predetermined length of time, herein referred to as the "dwell" time. This dwell time can be achieved either by letting the carcass remain stationary, ,within a relatively short zone, or alternatively by moving it continuously through a zone of much greater. length. The latter system is preferable since it enables the continuous processing of carcasses one after the other on a continuously moving conveyor system. This in turn enables the processing work to be carried out in the most efficient continuous manner, both upstream and downstream of the washing and scalding operation, and leads to overall economies in the operation in the entire process.

It does however produce its own series of problems. Thus the conveyor should preferably move at a predetermined speed, synchronized with the movement of conveyors relative to the rest of the processing facility. In other words it is not usually desirable to move a conveyor at a first speed in one part of the system and a second much slower speed at another part of the system, without allowing for the accumulation of carcasses in batches between one portion of the process and the next. Thus given a certain desired processing line speed, then it may be necessary to provide cleansing and scalding facilities in the form of several zones which extend along a substantial linear distance of the conveyor system. This in turn can require the occupation of a considerable length of a building which may be both inconvenient and expensive. In addition, it is desirable that the pumping and the heat exchange and filtering facilities for maintaining the conditions of the water within each of the various separate zones, is as far as possible at a centralized location so that it can all be controlled and monitored and serviced in a simple and economical manner.

BRIEF SUMMARY OF THE INVENTION

With the view to satisfying the various conflicting requirements noted above, the invention comprises apparatus for the vertical scalding of animal carcasses on a continuously moving conveyor line and comprising, means defining first and further chambers, a conveyor system having at least two conveyor portions supported in each of said first and further chambers, and conveyor means connecting the same whereby said at least two conveyor portions define a single conveyor path through said first and further chambers, means for suspending carcasses at spaced intervals along said conveyor system, and means for continuously moving said carcasses along said conveyor system whereby the same may be moved along said conveyor system within said first and further chambers along said conveyor path, first hot water deluge means located along a first one of said conveyor portions being located on either side thereof, and first supply means for supplying a hot water deluge thereto whereby hot water may pour continuously downwardly alongside each side of said first conveyor portion of said conveyor system, first collector means beneath said first conveyor portion for collecting water pouring downwardly therearound, first filter means for filtering said water collected in said collector means, first pumping means for pumping said Nater back upwardly to said water deluge means, further hot water deluge means, together with further collector means, further filter means, and further pumping means for said further conveyor portion in said further chamber, whereby hot water may be poured downwardly around carcasses on said further conveyor portion, and collected therebeneath and filtered and pumped therefrom upwardly, separately from water in said first hot water deluge means, and first and further heating means for respective ones of said water deluge means whereby the same may be maintained at desired elevated temperatures, separately from one another.

The invention further comprises such an apparatus and wherein said chambers comprise at least two spaced apart generally rectangular first and further chambers, and a connection pathway extending therebetween, and continuous conveyor means having a first portion passing around said first chamber, and a connection portion passing through said connection pathway means, and a further portion passing around said further chamber, and entry, means in one of said chambers, and exit means from an other of said chambers, said conveyor means passing first through said entry means then through said one chamber then through said connection pathway means and then through said further chamber and then out of said exit means of said further chamber, whereby carcasses may be continuously carried into said first chamber and processed therein, and transferred from said first chamber to said further chamber through said connection pathway means ,and processed in said further chamber, and then transferred from said further chamber through said exit means.

The invention further comprises such an apparatus wherein said first conveyor portion defines a generally U-shaped loop, extending through said first chamber, a transfer portion extending through said connection pathway, and a further generally U-shaped loop extending through said further chamber, and including first collection means located beneath said first U-shaped loop, and further collector means located beneath said further U shaped loop, and including first distribution tray means located above said first U-shaped loop for distributing water downwardly on either side thereof, and further including further tray distribution means located around said further U-shaped loop for distributing water downwardly on either side thereof.

The invention further comprises such an apparatus wherein said first and further deluge means include first and further distribution trays, for distributing water around said first and further conveyor portions, and tilt means, operable to tilt said first and further trays, whereby the same may be cleansed in place either automatically or manually.

The invention further comprises such an apparatus including lower stop means engageable with one of said trays, and upper stop means engageable with another of said trays, located on opposite sides of each portion of said first and further conveyor portion, and means for moving said trays relative to said stop means to tilt the same for cleansing thereof.

The invention further comprises such an apparatus wherein said first and further chambers define top walls and side walls, and wherein said conveyor portions are located above said top walls, and including opening means in said top walls for receiving suspension means depending from said conveyor portions.

The invention further comprises such an apparatus including support means adapted to be attached to a building fabric, and connectable to said conveyor system and to said chambers for supporting same within said building fabric.

The invention further comprises such an apparatus including control means for detecting the water flow rate and temperature in said deluge means, and controlling said heating means whereby to maintain stable flow rates and temperatures in each of said deluge means.

The invention further comprises such an apparatus and a method for the vertical scalding of animal carcasses utilizing the foregoing apparatus The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 6 is a section corresponding to FIG. 5 but viewed in the opposite directions of an upper portion of the apparatus and, showing movement thereof in phantom;

FIG. 7 is a section along line 7—7 of FIG. 6, and,

FIG. 8 is a top plan schematic illustration, of an apparatus having three processing zones.

DESCRIPTION OF A SPECIFIC EMBODIMENT

Figure 1:
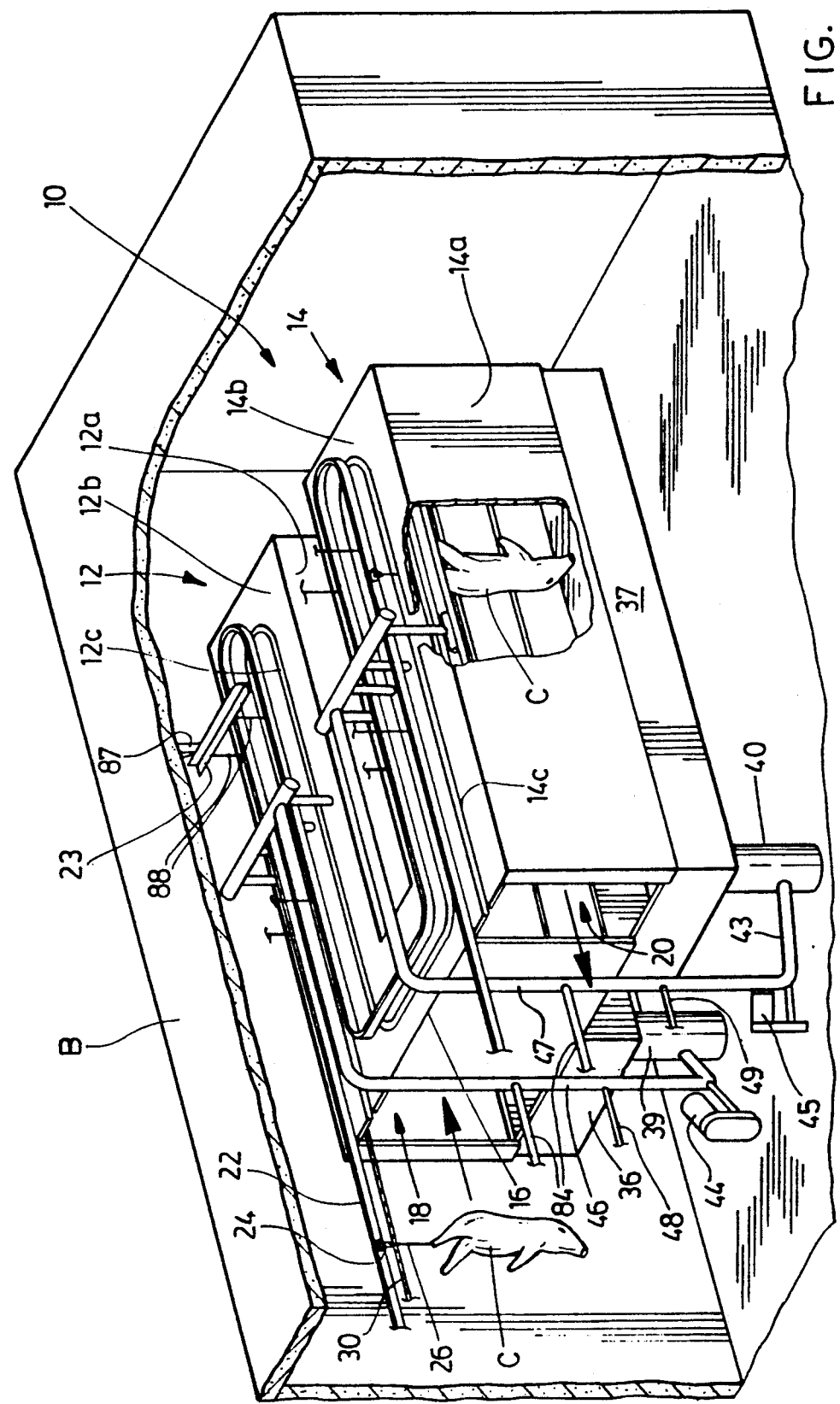
FIG. 1 is a partially schematic cut away perspective illustration of a carcass washing facility, incorporating the carcass washing apparatus in accordance with the invention.

Referring first of all to FIG. 1, it ,kill be seen that the invention is herein described in association with a processing facility indicated generally as 10, which in this case is provided for the vertical scalding of animal carcasses, in this case hog carcasses, indicated as C.

As can be seen from FIG. 1, in this embodiment, the facility indicated generally as 10 comprises two chambers namely a first chamber 12 and a further chamber 14 arranged spaced apart side by side with one another. A connection pathway portion or passageway 16 extends between the chambers, whereby carcasses may be transferred in a manner described below from the first chamber to the further chamber.

It will be appreciated that the two chambers could be formed as separate chamber zones within a single overall chamber, without departing from the invention, and that three or more such chambers could be provided, if desired, in some cases (FIG. 8).

First chamber 12 has an entry opening 18, and further chamber 14 has an exit opening 20. A conveyor rail 22 extends above the entry opening and over the chambers 12 and 14 and around the connection portion 16 and over the exit 20, for carrying carcasses throughout the facility.

Rail 22 is supported on cross bars 23 at spaced intervals.

Trollies 24 having wheels are adapted to run on the conveyor rail 22, and chains 26 suspended from the trollies are adapted to be attached typically to the hind leg of a carcass, by means of which each carcass may be suspended and carried throughout the facility.

In order to move the trollies along the conveyor rail, any typical movement means are provide such, as the chain 30, attached to respective trollies. Trollies are spaced along the chain 30 at regular intervals, which may vary depending upon the processing required to be applied to the carcasses or other products being carried through the chambers.

In order to separate the conveyors themselves from the interior of the chambers, each of the first and second chambers 12 and 14 will be seen to comprise respective sidewalls 12a-14a, and top walls 12b-14b. The top walls 12b-14b are located below the conveyor rail 22, and a continuous slotted opening or passageway 12c-14c is provided. This enables the chains 26 to hang downwardly from the conveyor rails and trolllos, through the slotted openings so that the carcasses themselves are suspended within the chambers. A similar slotted opening passes along the upper wall of the connector portion 16.

Figure 2:
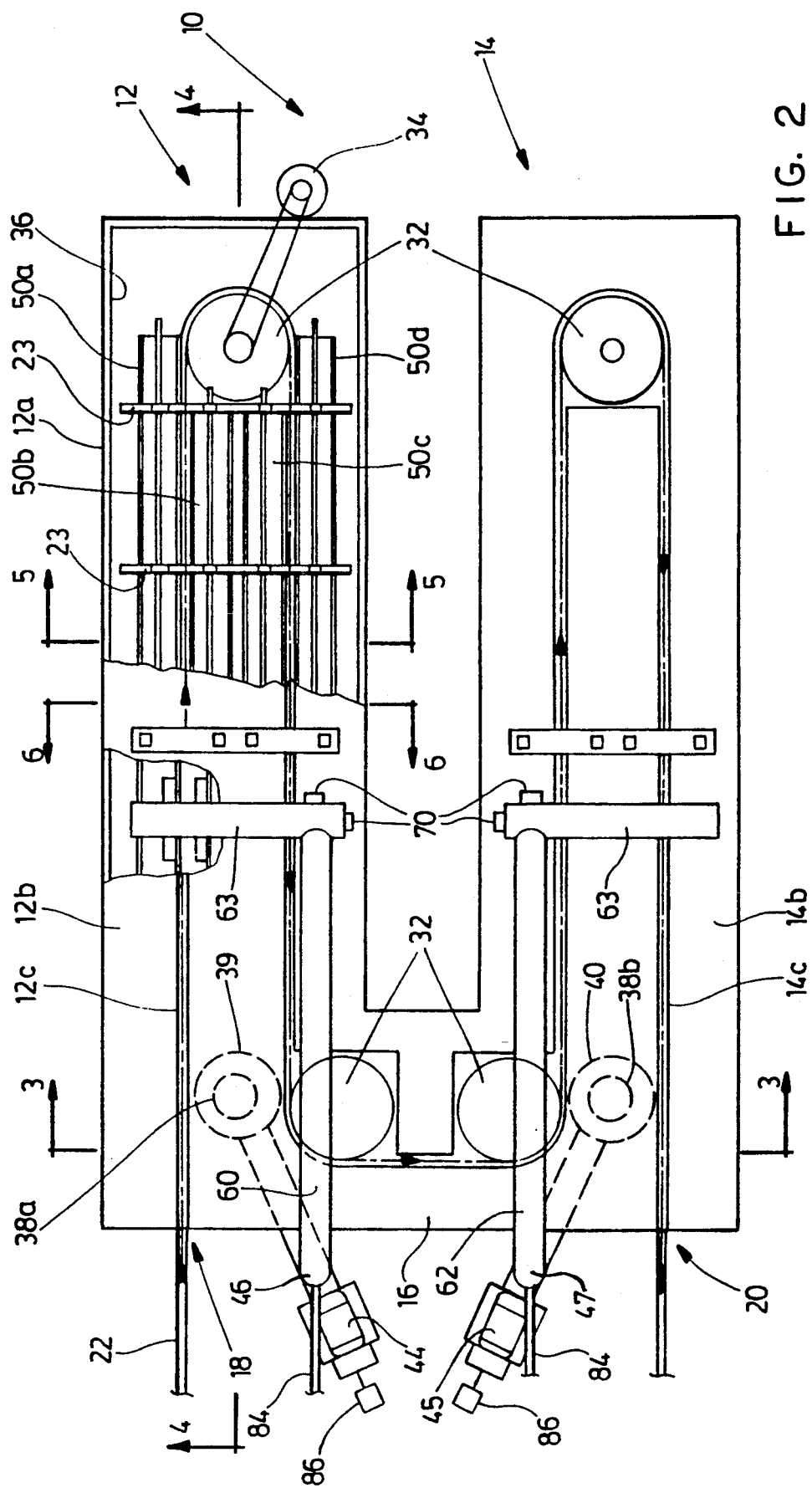
FIG. 2 is a schematic top plan view partially cut away of the facility of FIG. 1.
Figure 3:
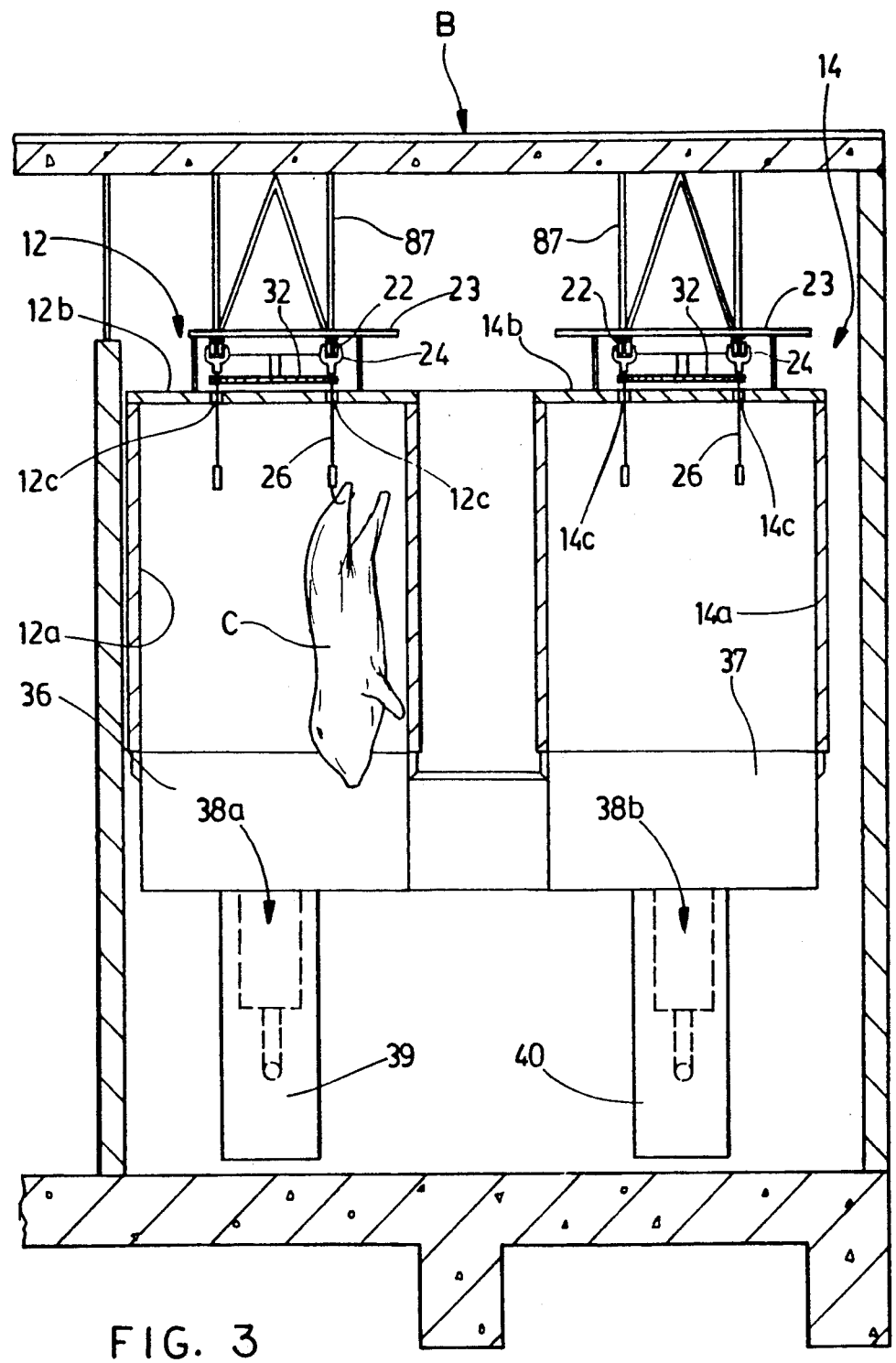
FIG. 3 is a section along the line 3—3 of FIG. 2.
Figure 4:
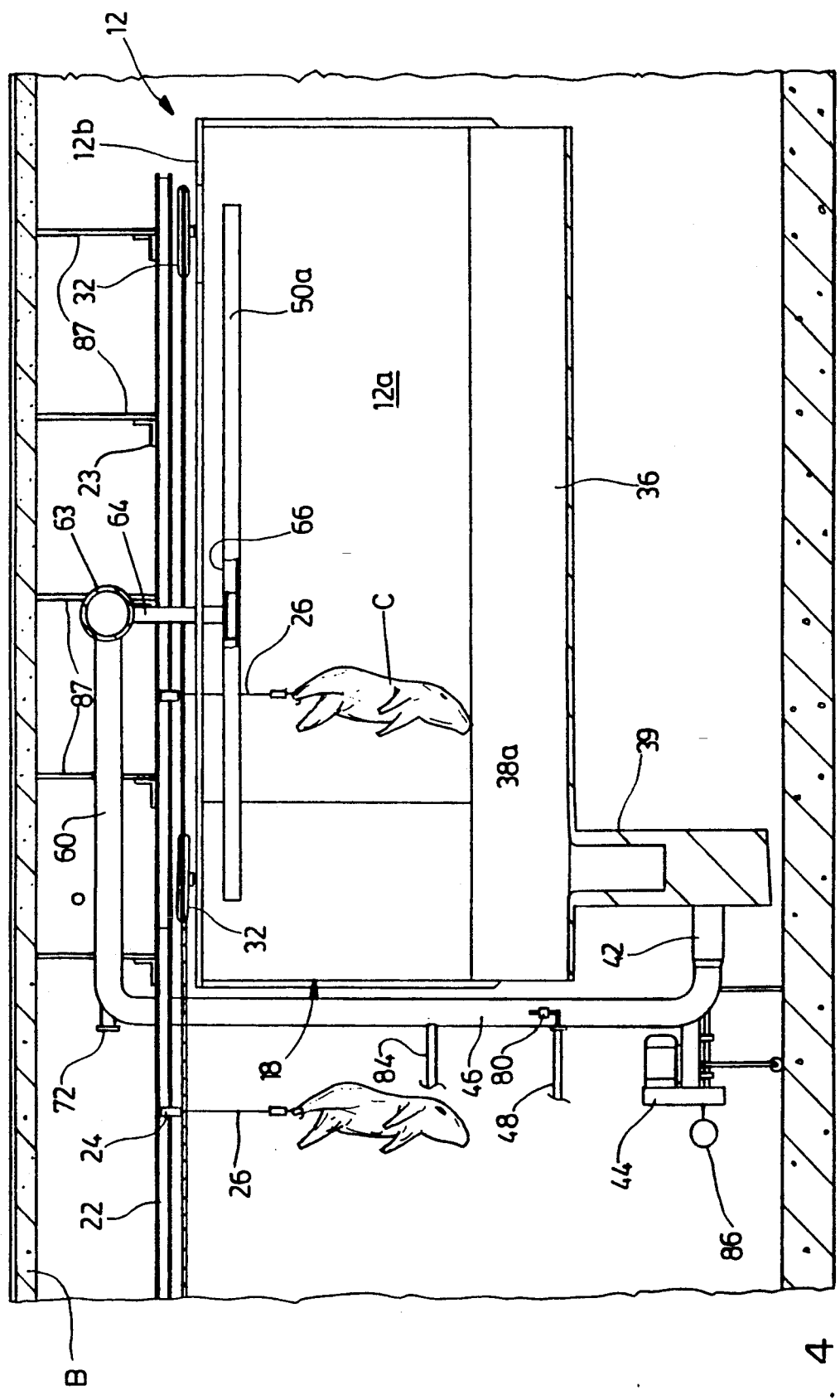
FIG. 4 is a section along the line 4—4 of FIG. 2.

As will be observed from FIG. 2, the conveyor rail is arranged above each of the first and further chambers 12-14 in the form of elongated U-shaped loops, the two arms of each U-shape being substantially parallel with one another, so that each U-shaped loop defines substantially a 180 degree turn.

At the location of the connection portion extending between the two chambers 12-14, the conveyor rail extends around two 90 degree corners. At each, of the U-shaped loops and at each of the 90 degree corners, guide wheels 32 are provided, around which the chain is adapted to run so as to maintain the same in tension.

Drive means may be provided in the form of a drive motor 34 connected preferably to one or other of the wheels 32 at the U-shaped loops. In this way, by the operation of the motor means, the chain may be driven so as to cause continuous movement of the chain and all trollies attached thereto along the conveyor rail.

Such a motor means may be any suitable prime mover such as an electrical motor, a hydraulic motor, a pneumatic motor, or the like, depending upon which is most convenient for the particular installation involved.

It will be appreciated that although not specifically illustrated, the conveyor rail 22 prior to its entry into the entry point 18 maybe provided with some form of stop means for controlling movement of carcasses, and some form of interlock or engagement means such as are well known in the art may be provided for connecting trolllos carrying carcasses, to the chain 30, at suitable intervals, so as to allow for some variation in processing speeds through the various stages of the carcass processing facility which may be located upstream, or downstream, of the scalding facility 10. This would in any event be well known to persons skilled in the art, and would simply be an optional addition to the conveyor system, such as might be utilized in certain circumstances depending upon customer requirements, and is therefore not illustrated herein for the sake of clarity. Located directly beneath each of the linear runs or arms of the conveyor rail, within each of the first and further chambers 12 and 14, there is located a respective water collector or trough 36-37. Each of the troughs is angled towards one end of the respective chambers, so as to cause water to drain in that direction.

At the lower end of each of the troughs, drains 38a, 38b are connected to filters 39-40. Each of filters 39-40 are connected through respective conduits 42, 43 to pumps 44-45. Pumps 44-45 in turn are connected to substantially vertical conduits 46-47.

Thus the same configurations of separate filters, water conduits, and pumps are provided for the first and further chambers. In this way water may be continuously cycled to, and withdrawn from, the respective first and further chambers 12 and 14, and pumped upwardly above the respective chambers 12 and 14, while the two bodies of water in the two chambers are kept substantially separate from one another.

In this way, water collected in the trough in one chamber is continuously filtered, and pumped back upwardly through its respective conduit, without being mixed with water circulating in the other of the chambers.

Heat exchanger tubes 48-49 are connected to the conduits 46-47, so that the water flowing in the respective conduits may be maintained at a preset temperature. It will thus be seen that the temperature of the water circulating within the respective first and further chambers 12-14 may be maintained at different set points if that is desired in accordance with the process being carried out.

In order to provide a downward flow or deluge of water for washing or scalding the carcasses in the respective chambers, water distribution trays 50 A-B-C-D are suspended along either side of the linear portions of the conveyor rails in each of the chambers. Preferably they are suspended by pivotal bearings 52 and control arms 54.

Each of the trays is provided with a large number of holes or openings through which water may pour downwardly.

The trays are normally held horizontal, but may be tilted into a steeply angled orientation for cleaning. Such tilting is preferably power operated and is achieved by means such as the cylinders 56 connected to the arms 54 and secured on cross bars 57.

Figure 5:
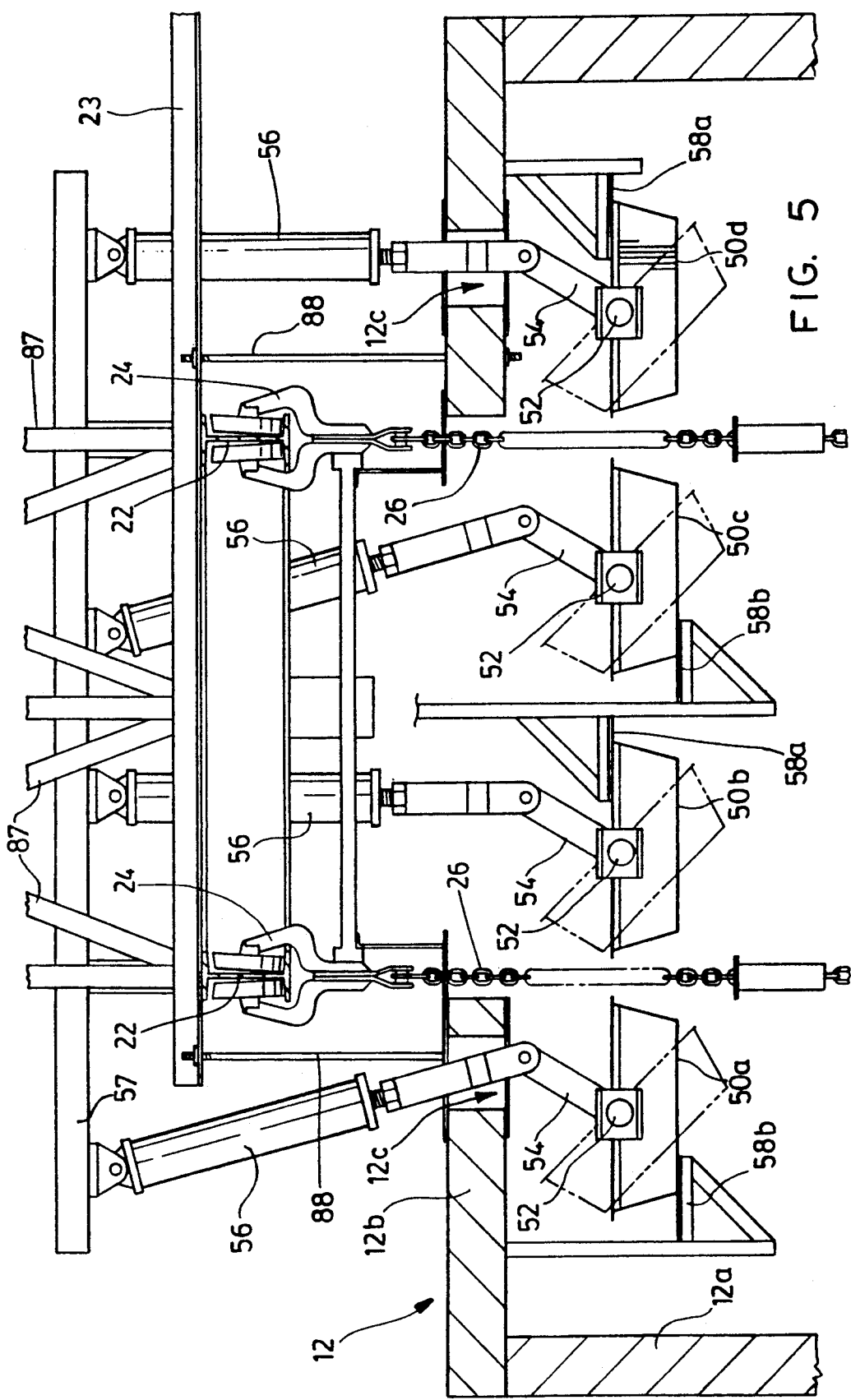
FIG. 5 is an enlarged section along the line 5—5 of FIG. 2.

In order to provide a secure horizontal registration of each of the trays during operation, each of the trays is provided with respective abutment members 58a, 58b (FIG. 5), against which one edge of the tray will engage and register when in the horizontal position.

It will be noted that the abutment members 58a for the trays on one side of a conveyor rail are adapted to engage the upper sides of their respective trays, whereas the abutment members 58b for the trays on the other side of the conveyor are adapted to engage the underside of the respective trays.

In order to supply water to the trays, each of the vertical conduits 46-47 is connected to respective substantially horizontal conduits 60-62 extending longitudinally along the length of each of the chambers.

Conduits 60-62 are in turn connected to transverse conduits 63 and they are connected to a plurality of downwardly extending conduits 64. These in turn are connected to longitudinally extending tray distribution conduits 66. Conduits 66 are located in trays 50 and have a plurality of jet openings 68-68 extending along either side thereof (FIGS. 6 and 7). The jets are angled so as to spray water outwardly on either side of each of the distribution conduits to ensure even distribution in the trays.

In order to maintain the sanitary status of each of the water circulation systems, suitable clean out openings, indicated as 70 and 72, for example, are provided at various locations in the conduits where needed. In this way, the entire installation may periodically be shut down, and the conduits flushed out and cleansed, so as to maintain the clean status of the entire system.

During normal operation, animal carcasses are attached to the trollies by means of chains, and are carried through the first chamber 12 then through the connection portion 16 and then through the further chamber 14. The carcasses as they enter the first chamber will have been freshly killed and will contain residues of bodily fluids, and will also be contaminated with dirt and focal matter.

As the carcasses pass through the first chamber, they will be subjected to a continuous high mass flow deluge of hot water showering downwardly from the trays. This is achieved by means of the operation of the pump, causing upward flow of water which is then distributed along the trays by means of the conduits and jets.

The carcasses are thus cleansed of the main quantity of bodily fluids, mud, fecal matter and other contaminants, in the first chamber.

The carcasses then pass through the connection portion 16, and then into the further chamber 14. In the further chamber they are again subjected to a continuous high mass flow deluge of hot water pouring downwardly from the trays. As explained above, the water in the second chamber is maintained separate from the water circulating in the first chamber system, and consequently is free of the contamination which would be present in the water in the first chamber other than any minor quantity of water droplets that may be adhering to the carcass, as it moves from the first to the further chamber.

Consequently, the carcasses receive essentially two washing and scalding steps one after the other, with two entirely separate batches of water, with each batch being continuously and separately filtered, and reheated.

It will of course be appreciated that in some cases it may be desirable to have three or more such separate chambers, each, with separate circulation system, if desired (FIG. 8).

During the operation of the system some of the water from each of the circulating systems may be withdrawn, and fresh water added, so as to avoid the continual buildup of contamination.

At periodic intervals it will be necessary to clean out the entire apparatus, while there are no carcasses on the conveyor rail.

For the purposes of cleaning, the collector tanks will be emptied, and fresh water will be added, with suitable cleansing agents and disinfectants if necessary. By the operation of the cylinders 56 the trays 50 will then be tilted (see FIG. 6). The pumps are then operated, so as to transfer clean water upwardly and distribute it through the distribution pipes and jets. The jets will impinge upon the trays which at this point are tilted with their horizontal surfaces now more or less steeply angled.

This will have the effect of flushing and cleansing the trays, and the entire water circulation system.

From time to time, any residue of contaminants that may build up in the conduits may be cleaned out in the usual manner, by opening up clean outs such as 70 and 72, and passing suitable cleansing instruments or spray nozzles therethrough.

In order to heat the water circulating in the two systems, to the desired temperature, any suitable heat exchanger means 48-49 may be incorporated, for circulating some or all of the water in each of the systems in contact with any suitable heat exchange medium.

In the present embodiment, heat is maintained in the water by means of steam injector heads 80 (and 82) connected to tubes 48-49 incorporated in the upright conduits 46-47, and which are connected to any suitable source of steam heat not shown. Suitable regulator and valves (not shown) are incorporated in the steam supply pipes, for controlling emission of steam from the jets.

Suitable temperature sensors 84-84 are incorporated in the system, for sensing the temperature of water circulating therein, and are connected to steam control valves (not. shown), whereby to maintain a stable preset desired water temperature in each of the first and further processing chambers.

Flow control sensors 86-86 may be associated with pumps 44-45 to monitor the flow rate of water within each system, The actual construction of the chambers 12 and 14 may take various forms. Bars 23 are suspended within a building B, by angled struts 87 They support bars 57, and, in the present case, for simplicity the chambers are of sheet metal construction and are suspended by rods 88 (FIGS. 1 and 5), connected to bars 23.

The conveyor rail 22 is secured at intervals to cross bars 23 (FIG. 1 ). Cross bars 23 are suspended on rods or struts 87 from the interior of a building fabric B.. Rods 87 also support cross bars 57, as mentioned above.

As illustrated in FIG. 8 the apparatus may provide for more than two processing zones. In this case they would be arranged generally as zones 12a, 12b and 12c in FIG. 8. The apparatus in each zone would be essentially the same as that described for zones in chambers 12a and 12b, above.

If desired, in some cases, the cleaner water from zone 12c, for example, could be reused in zone 12a, or even 12b. In other words, the cleaner water from the downstream zone(s) may be transferred to one or another of the upstream zones. This will reduce the overall water consumption, without substantially reducing the efficiency of the cleansing and scalding function.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. Vertical scalding apparatus for scalding animal carcasses on a conveyor line and comprising:
    wall means defining at least a first and a further chamber means;
    a conveyor system having at least first and further conveyor portions, associated with said first and further chamber means, and conveyor means connecting the same whereby said conveyor portions define a single conveyor path for moving carcasses through said first and further chamber means;
    means for suspending carcasses at spaced intervals along said conveyor system, whereby said carcasses may be moved along said conveyor system within said chamber means along said conveyor path;
    first hot water deluge tray means located along a first one of said conveyor portions being located on either side thereof above said carcasses, and first supply means for supplying a hot water deluge to said tray means whereby hot water may pour continuously downwardly alongside each side of carcasses on said first conveyor portion of said conveyor system;
    first collector means beneath said first conveyor portion for collecting water pouring downwardly therearound; first filter means for filtering said water collected in said first collector means;
    first pumping means for pumping said water back upwardly to said first water deluge tray means;
    further hot water deluge tray means, together with further supply means, further collector means, further filter means, and further pumping means for said at least one further conveyor portion, whereby hot water may be poured downwardly around carcasses on said at least one further conveyor portion, and collected therebeneath and filtered and pumped therefrom upwardly once more, separately from water in said first chamber means;
    tilt means operable to tilt said first and further tray means to facilitate cleansing thereof, and,
    heating means for said water means in both said first and further chamber means whereby the same may be maintained at predetermined desired temperatures.

2. Vertical scalding apparatus as claimed in claim 1 wherein said chamber means comprises spaced apart first and further chambers, and a connection pathway extending therebetween, and continuous conveyor means having a first portion for passing carcasses around said first chamber, and a connection portion for passing carcasses through said connection pathway means, and a further portion for passing carcasses around said further chamber, and entry means in said first chamber, and exit means from said further chamber, said conveyor means passing carcasses first through said entry means then through said first chamber then through said connection pathway means and then through said further chamber and then out of said exit means, whereby carcasses may be continuously carried into said first chamber and processed therein, and transferred from said first chamber to said further chamber through said connection pathway mans and reprocessed in said further chamber, and then transferred from said further chamber through said exit means.

3. Vertical scalding apparatus as claimed in claim 2 wherein said first conveyor portion defines a generally U-shaped portion, extending through said first chamber, a transfer portion extending through said connection pathway, and a further generally U-shaped portione extending through said further chamber, and including first collection means located beneath said first U-shaped portion, and further collector means located beneath said further conveyor portion, and including first distribution tray means located above said first U-shaped portion, for distributing water downwardly on either side thereof, and further including further tray distribution tray means located around said further U-shaped portion for distributing water downwardly on either side thereof.

4. Vertical Scalding apparatus as claimed in claim 1 and including lower stop means engageable with some of said tray means, and upper stop means engageable with others of said tray means, located on opposite sides of each portion of said first and further conveyor portions, and means for moving said means relative to said stop means to tilt the same for cleansing thereof.

5. Vertical Scalding apparatus as claimed in claim 2 wherein said first and further chambers define top walls and side walls, and wherein said conveyor portions are located above said top walls, and including opening means in said top walls for receiving suspension means depending from said conveyor portions.

6. Vertical scalding apparatus as claimed in claim 5 including support means adapted to be attached to a building fabric, and connectable to said conveyor system and to said chambers for supporting same within said building fabric.

7. Vertical scalding apparatus as claimed in claim 1 including control means for detecting the water flow rate and temperature of water flowing in said deluge tray means, and controlling said heating means whereby to maintain stable flow rates and temperatures in each of said chambers.

8. A method for the vertical scalding of animal carcasses and comprising the steps of moving animal carcasses on a continuously moving conveyor line through a facility which comprises:
    wall means defining at least a first and further chamber means;
    a conveyor system having at least first and further conveyor portions, associated with said first and further chamber means, and conveyor means connected the same whereby said conveyor portions define a single conveyor path for moving carcasses through said first and further chamber means;

means for suspending carcasses at spaced intervals along said conveyor system, whereby said carcasses may be moved along said conveyor system within said chamber means along said conveyor path;

first hot water deluge tray means, located along a first one of said conveyor portions, being located on either side thereof above said carcasses, and first supply means for supplying a hot water deluge to said tray means whereby hot water may pour continuously downwardly from said tray means alongside each side of carcasses on said first conveyor portion of said conveyor system;

first collector means beneath said first conveyor portion for collecting water pouring downwardly therearound; first filter means for filtering said water collected in said first collector means;

first pumping means for pumping said water back upwardly to said first water deluge means;

further hot water deluge tray means, together with further supply means, further collector means, further filter means, and further pumping means for said at least one further conveyor portion, whereby hot water may be poured downwardly from said tray means around carcasses on said at least one further conveyor portion, and collected thereberneath and filtered and pumped therefrom upwardly once more, separately from water in said first chamber means, and, tilt means for tilting said tray means, and, heating means for said water in both said first and further chamber means whereby the same may be maintained at predetermined desired temperatures; and including the steps of;

passing carcasses first through said first chamber means and then through said further chamber means, whereby carcasses may be continuously carried in generally vertical orientation into said first chamber means and processed with water therein, and transferred from said first chamber means to said further chamber means and processed with water in said further chamber means, and then transferred from said further chamber means, and, periodically terminating scalding of said carcasses, and then tilting said first and further tray means, and thereafter operating said first and further pumping means whereby to spray said tray means and cleanse the same.

9. A method for vertical scalding as claimed in claim 8 wherein said first conveyor portion defines a generally U-shaped portion, extending through said first chamber, a transfer portion extending through said connection pathway, and a further generally U-shaped portion extending through said further chamber, and including first collection means located beneath said first U-shaped portion, and further collector means located beneath said further conveyor portion, and including first distribution tray means located above said first conveyor portion, for distributing water downwardly on either side thereof, and further including further tray distribution means located around said further conveyor portion for distributing water downwardly around said further conveyor portion.

* * * * *